United States Patent
Qian

(10) Patent No.: US 10,309,807 B2
(45) Date of Patent: Jun. 4, 2019

(54) RESOLVER CALIBRATION FOR PERMANENT MAGNET SYNCHRONOUS MOTOR

(71) Applicant: Infineon Technologies AG, Neubiberg (DE)

(72) Inventor: Wei Zhe Qian, Beijing (CN)

(73) Assignee: Infineon Technologies AG, Neubiberg (DE)

( * ) Notice: Subject to any disclaimer, the term of this patent is extended or adjusted under 35 U.S.C. 154(b) by 1096 days.

(21) Appl. No.: 14/496,079

(22) Filed: Sep. 25, 2014

(65) Prior Publication Data

US 2015/0100264 A1    Apr. 9, 2015

(30) Foreign Application Priority Data

Oct. 8, 2013    (CN) .......................... 2013 1 0481715

(51) Int. Cl.
| | | |
|---|---|---|
| G01D 18/00 | (2006.01) | |
| G01D 5/20 | (2006.01) | |
| H02P 6/18 | (2016.01) | |
| H02P 21/18 | (2016.01) | |

(52) U.S. Cl.
CPC ............ *G01D 18/00* (2013.01); *G01D 5/2046* (2013.01); *H02P 6/183* (2013.01); *H02P 21/18* (2016.02)

(58) Field of Classification Search
CPC .................................................... G01D 18/00
See application file for complete search history.

(56) References Cited

U.S. PATENT DOCUMENTS

2004/0019446 A1*    1/2004    Kim ....................... G01D 5/242
                                                             702/106

FOREIGN PATENT DOCUMENTS

| CN | 102882451 A | 1/2013 |
|---|---|---|
| CN | 103269200 A | 8/2013 |
| DE | 112004002619 T5 | 10/2006 |
| DE | 112010002340 T5 | 8/2012 |
| JP | H1175394 A | 3/1999 |

(Continued)

OTHER PUBLICATIONS

Kim et al., "PWM Switching Frequency Signal Injection Sensorless Method in IPMSM," in IEEE Transactions on Industry Applications, vol. 48, No. 5, pp. 1576-1587, Sep.-Oct. 2012.*

(Continued)

*Primary Examiner* — John E Breene
*Assistant Examiner* — Jeffrey C Morgan
(74) *Attorney, Agent, or Firm* — Schiff Hardin LLP

(57) ABSTRACT

The present invention relates to resolver calibration for permanent magnet synchronous motor. According to embodiments of the present invention, the high frequency rotating voltage vector is generated and injected into a resolver associated with a permanent magnet synchronous motor (PMSM). Due to the saliency effect, when a reference point is detected in a phase current, the rotor position of the PMSM is known. At this point, by acquiring the resolver position, the resolver offset may be accurately determined for calibration. According to embodiments of the present invention, the resolver offset may be accurately determined and calibrated without increasing device dimension and cost. Respective methods, apparatuses, systems, and computer products are disclosed.

20 Claims, 5 Drawing Sheets

(56) References Cited

FOREIGN PATENT DOCUMENTS

JP    2002-325493 A    11/2002
JP    2010-011543 A    1/2010

OTHER PUBLICATIONS

Office Action dated Feb. 22, 2016 for German Patent Application No. 102014014933.1.
Office Action dated Jan. 2, 2018 issued for Chinese Patent Application No. 201310481715.9.
Feng Qin, et al., "Comparative Investigation of Sensorless Control with Two High-Frequency Signal Injection Schemes", Proceedings of the CSEE, Mar. 31, 2005.
Office Action dated Dec. 10, 2015 for Korean Patent Application No. 2014-0136085.

* cited by examiner

RESOLVER CALIBRATION FOR PERMANENT MAGNET SYNCHRONOUS MOTOR

FIELD OF INVENTION

Embodiments of the present invention generally relate to the field of motors, and more specifically, to a method and apparatus for use in calibration of a resolver associated with a permanent magnet synchronous motor.

BACKGROUND OF INVENTION

Due to advantages such as light weight, compact volume, high power density, and high overall efficiency, permanent magnet synchronous motors (PMSMs) are widely used in various fields like hybrid electric vehicles, electric vehicles, and so forth. Control techniques are critical to exploit the power capability of PMSMs. As known, the torque generated by a PMSM may be controlled by controlling current of the PMSM because they are usually proportional. In order to effectively control the current of the PMSM, it is necessary to continuously acquire rotor position of the PMSM. It should be noted that as used herein, the term "rotor position" refers to a relative angle rather than the absolute position of the motor rotor in the PMSM. For example, the rotor position is usually defined as the leading angle between the magnetic flux linkage of the motor rotor and the α-axis in the stator frame.

In order to obtain the rotor position of the PMSM, the PMSM is usually provided with an associated resolver. A resolver is a rotatable electronic transformer, which functions as a position sensor to continuously sense the positions of the motor rotor in the PMSM. Output of the resolver is generally of a sine or cosine waveform, which can be converted into angle values in digital forms by a dedicated converter. However, since the angle value provided by the resolver indicates the absolute position of the motor rotor, it cannot be directly used as the rotor position required in PMSM control as described above. It can be appreciated that only when a zero position of the resolver of the PMSM is mechanically, strictly aligned with the zero point of control angle of the motor, the angle provided by the resolver could be directly used as the rotor position of the PMSM. However, this is nearly impossible in practice since such mechanical alignment would increase the complexity of the design and manufacturing and consume more time and manpower, thereby significantly increasing costs.

An offset between the zero position of the resolver and the control zero point of the PMSM is referred to as a resolver offset. In order to calibrate the resolver offset, a key issue is how to accurately determine such offset. Several solutions for determining the resolver offset have been proposed. For example, the offset may be estimated by measuring the back electromotive force waveform of the PMSM. The resolver offset may also be determined and calibrated by measuring the torque generated by the PMSM. However, those solutions must rely on additional circuits and/or devices, which increases costs and device dimensions and restricts the applicable fields of the PMSM. Moreover, the resolver offset determined by some known solutions often cannot meet the requirements of motor control in terms of accuracy.

In view of the foregoing, there is a need in the art for a simple, feasible, and cost-effective solution for accurately determining the offset of a resolver associated with the permanent magnet synchronous motor, in order to calibrate the resolver.

SUMMARY OF INVENTION

In order to solve the above and other potential problems, the present invention proposes a technical solution used in calibrating a resolver associated with a permanent magnet synchronous motor.

Generally speaking, a basic idea of the present invention is to make use of the saliency effect in the permanent magnetic synchronous motor to determine the resolver offset. Due to the saliency effect, there is an inherent correspondence between the phase current generated by the PMSM and the rotor position. Further, correspondence between the phase current and the resolver position can be established by appropriately obtaining the resolver position based on the detection of the phase current. In this way, by use of the phase current, values of both the resolver position and the rotor position at the same particular time instant may be acquired so as to determine the resolver offset. To this end, the technical problems to be addressed at least include: (1) controlling the PMSM to generate an appropriate phase current available for detection, and (2) determining the resolver offset by detecting the phase current.

A first aspect of the present invention relates to a solution for controlling a PMSM to generate a detectable phase current. Embodiments in this aspect comprise a method for use in calibration of a resolver associated with a permanent magnet synchronous motor. The method comprises: generating a high frequency rotating voltage vector; injecting the high frequency rotating voltage vector into the permanent magnet synchronous motor which is operating at a low speed to cause the permanent magnet synchronous motor to generate a phase current, the phase current being for use in the calibration of the resolver.

Embodiments in this aspect further comprise an apparatus for use in calibration of a resolver associated with a permanent magnet synchronous motor. The apparatus comprises: a voltage generating unit configured to generate a high frequency rotating voltage vector; a voltage injecting unit configured to inject the high frequency rotating voltage vector into the permanent magnet synchronous motor that is operating at a low speed to cause the permanent magnet synchronous motor to generate a phase current, the phase current being for use in the calibration of the resolver.

According to the first aspect of the present invention, it is possible to achieve effective control of the PMSM by injecting the high frequency rotating voltage vector such that the PMSM generates a phase current to be detected. Moreover, such control of the PMSM is simple and feasible. Specifically, since the injected rotating voltage vector is of high frequency, impact of the pure resistive voltage drops within the PMSM can be eliminated to therefore facilitate improving the accuracy of subsequent detection and calibration.

A second aspect of the present invention relates to a solution for determining a resolver offset by phase current detection. Embodiments in this aspect comprise a method for use in calibration of a resolver associated with a permanent magnet synchronous motor. The method comprises: responsive to a high frequency rotating voltage vector being injected into the permanent magnet synchronous motor operating at a low speed, detecting a reference point associated with a phase current generated by the permanent magnet synchronous motor; acquiring a position of the resolver when the reference point is detected; and determining an offset between the acquired position of the resolver and a rotor position of the permanent magnet synchronous motor corresponding to the reference point for calibrating the resolver.

Embodiments according to this aspect further comprise an apparatus for use in calibration of a resolver associated with a permanent magnet synchronous motor. The apparatus comprises: a current detecting unit configured to detect, responsive to a high frequency rotating voltage vector being injected into the permanent magnet synchronous motor operating at a low speed, a reference point associated with a phase current generated by the permanent magnet synchronous motor; a position acquiring unit configured to acquire a position of the resolver when the reference point is detected; and an offset determining unit configured to determine an offset between the acquired position of the resolver and a rotor position of the permanent magnet synchronous motor corresponding to the reference point for calibrating the resolver.

According to the second aspect of the present invention, due to the saliency effect in the PMSM, the phase current is utilized to establish a quantitative correspondence between the rotor position and the resolver position. As such, embodiments of the present invention may determine the offset of the resolver associated with the PMSM with less cost and higher accuracy.

Other aspects of the present invention comprise computer program products for implementing the methods described above, and a system for use in the calibration of the resolver associated with the PMSM which comprises the apparatuses described above. It would be appreciated through the following depiction that embodiments according to the present invention are cost-effective. Moreover, embodiments of the present invention have a good compatibility and may be applied to various PMSMs with the saliency effect, including those PMSMs that have been deployed and put into use.

BRIEF DESCRIPTION OF DRAWINGS

The above and other objectives, features and advantages of the present invention will become more apparent through more detailed depiction of the exemplary embodiments of the present invention with reference to the accompanying drawings.

Same or like reference numerals are used to represent same or corresponding elements throughout the drawings.

DETAILED DESCRIPTION OF EMBODIMENTS

Hereinafter, some embodiments of the present invention will be described in more detail with reference to the accompanying drawings. Although some embodiments of the present invention are shown in the accompanying drawings, it should be understood that the present disclosure may be implemented in various manners and thus should not be construed as being limited to the embodiments described therein. To the contrary, those embodiments are provided for the thorough and complete understanding of the present disclosure, and for the capability of completely conveying the scope of the present disclosure to those skilled in the art.

As outlined above, the basic idea of the present invention is to determine a resolver offset by making use of the saliency effect in the permanent magnetic synchronous motor. It is known that in various kinds of PMSMs, such as interior PMSM, V-shaped interior PMSM, radial arranged interior PMSM, and so forth, the magnetic flux of permanent magnets have lower permeability than iron. As a result, the effective air gap in the magnetic flux path varies with the position of motor rotor. This phenomenon is called saliency effect, which causes the PMSM phase current (especially the low frequency component thereof) to be modulated by the rotor position of the PMSM. In other words, there is an inherent correspondence between amplitude of the phase current and the rotor position. Furthermore, a correspondence between the phase current and the resolver position can be established by appropriately obtaining the resolver position based on the detection of the phase current. In this way, it is possible to build a quantitative correspondence between the resolver position and the rotor position by means of the phase current, thereby determining the resolver offset.

Figure 1:
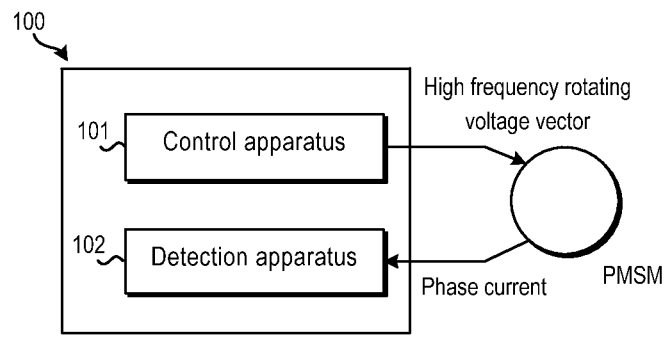
FIG. 1 shows a block diagram of a calibrating system for a resolver associated with a PMSM according to an exemplary embodiment of the present invention.

Reference is first made to FIG. 1 which shows a block diagram of a calibrating system 100 for calibration of a resolver associated with a PMSM according to an exemplary embodiment of the present invention. As shown, the calibrating system 100 generally comprises two apparatuses: a control apparatus 101 and a detection apparatus 102. According to embodiments of the present invention, in operation, the control apparatus 101 is configured to generate a high frequency rotating voltage vector, and inject the generated high frequency rotating voltage vector into a PMSM which is operating at a low speed. As used herein, the term "low speed" means that the rotating speed of the PMSM is lower than a predetermined threshold. Driving the PMSM to operate at the low speed facilitates improving the detection resolution of the phase current and the calibration accuracy. Specifically, according to embodiments of the present invention, it is beneficial to make the difference between the rotating frequency of the injected voltage vector and the rotating speed of the PMSM large enough. In implementation, the rotating speed of the PMSM may be determined based on various factors such as parameters of the PMSM, control techniques as used, and so forth. The scope of the present invention is not limited in this regard.

Responsive to the injection of the high frequency rotating voltage vector, the PMSM will generate phase currents. The detection apparatus 102 is operable to sample a phase current generated by the PMSM and detect a reference point associated with the phase current. When such reference point is detected, the detection apparatus 102 obtains the position of the resolver at that moment. As mentioned above, due to the saliency effect, at the particular time instant when the reference point is detected, the rotor position of the PMSM corresponding to the reference point is known. Accordingly, the offset between the resolver position and the rotor position may be determined based on the obtained resolver position and the rotor position at the same time.

Figure 2:
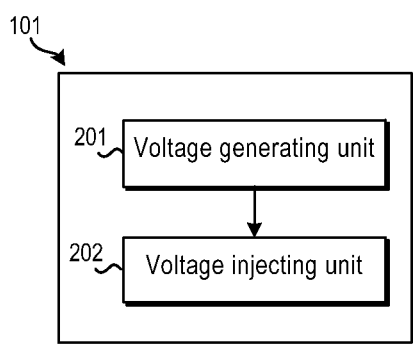
FIG. 2 shows a block diagram of a control apparatus for use in calibration of a resolver associated with a PMSM according to an exemplary embodiment of the present invention.

Refer to FIG. 2, which shows a block diagram of the control apparatus 101 according to an exemplary embodiment of the present invention. As shown, the control apparatus 101 comprises a voltage generating unit 201 configured to generate a high frequency rotating voltage vector. As used herein, "high frequency rotating voltage vector" refers to a voltage vector rotating at an angular velocity higher than a predetermined threshold. As an example, in some embodiments, the rotating frequency of the high frequency rotating voltage vector may be within a range from 500 Hz to 2500 Hz. In other embodiments, any other suitable values may be used depending on parameters of the PMSM. It would be appreciated that generating and utilizing the rotating voltage of a high frequency facilitate protecting subsequent detection from the potential impact of pure resistive voltage drops within the PMSM.

Specifically, in some embodiments, the voltage generating unit 201 may be configured to generate the high frequency rotating voltage vector with fixed amplitude and rotating frequency. Alternatively, the amplitude and/or rotating frequency of the high frequency rotating voltage vector may be changed, for example, periodically or responsive to user input. The scope of the present invention is not limited in this regard. As an example, in some embodiments, the high frequency rotating voltage vector as generated by the voltage generating unit 201 may be expressed as follows:

$$\vec{v}_{c\alpha\beta} = V_c e^{j\omega_c t} \quad (1)$$

wherein $\vec{v}_{c\alpha\beta}$ represents the high frequency rotating voltage vector for α and β axes of the PMSM, $V_c$ represents amplitude of the voltage, $\omega_c$ represents an angular velocity, and t represents time. It should be noted that the high frequency rotating voltage vector as expressed in equation (1) is just exemplary. The high frequency rotating voltage vector may be generated in any manners, no matter currently known or developed in the future, and the scope of the present invention is not limited in this regard.

Continuing reference to FIG. 2, the control apparatus 101 further comprises a voltage injecting unit 202 configured to inject the high frequency rotating voltage vector generated by the voltage generating unit 201 into the PMSM which is operating at a low speed, in order to cause the PMSM to generate a phase current for calibration of the resolver. For example, for a three-phase PMSM, the voltage injecting unit 202 may inject the high frequency rotating voltage vector into stator windings of the PMSM via three-phase terminals.

According to embodiments of the present invention, it is possible to keep the PMSM rotating at a low speed in various manners. For example, a reference voltage vector may be used to drive the PMSM prior to injecting the high frequency rotating voltage vector. Then the supply of the reference voltage vector may be switched off such that the PMSM continues to rotate by inertia for a certain period. Alternatively or additionally, an appropriate reference voltage vector may be supplied to the PMSM while injecting the high frequency rotating voltage vector, so as to drive the PMSM to operate at a low speed. Specifically, in those embodiments where the PMSM is continuously driven by the reference voltage vector, the high frequency rotating voltage vector and the reference voltage vector may be merged, such that the voltage injecting unit 202 injects the merged voltage vector into the PMSM. The embodiment in this aspect will be detailed in the following.

It would be appreciated through the above descriptions that the control apparatus 101 may effectively control the PMSM by generating and injecting the high frequency rotating voltage vector, such that the PMSM generates a phase current available for detection. Specifically, since the rotating voltage vector injected by the control apparatus 101 is of high frequency, the potential impact of pure resistive voltage drops within the PMSM can be effectively eliminated, which facilitates improving the accuracy of subsequent detection and calibration. Additionally, control of the PMSM is quite simple and convenient. Moreover, the control apparatus 101 may be used in connection with any currently known or future developed PMSM with saliency effect and therefore has good compatibility.

Figure 3:
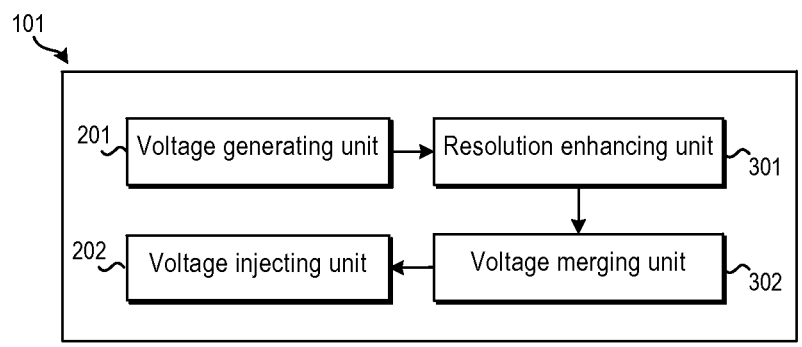
FIG. 3 shows a block diagram of a control apparatus for use in calibration of a resolver associated with a PMSM according to another exemplary embodiment of the present invention.

FIG. 3 shows a block diagram of the control apparatus 101 according to another exemplary embodiment of the present invention. As shown in FIG. 3, the control apparatus 101 comprises a voltage generating unit 201 and a voltage injecting unit 202 as well. Various features as described above with reference to FIG. 2 are also applicable to the control apparatus 101 as shown in FIG. 3.

In some embodiments of the present invention, the high frequency rotating voltage vector generated by the voltage generating unit 201 may be subjected to the pulse width modulation (PWM). For example, in some embodiments, space vector pulse width modulation (SVPWM) or its any variations may be performed on the high frequency rotating voltage vector. It should be noted that other forms of PWM are also possible and the scope of the present invention is not limited in this regard. According to embodiments of the present invention, the PWM of the high frequency rotating voltage vector may be performed by the voltage generating unit 201 or by any other appropriate component.

In such embodiments, a resolution enhancing unit 301 in the control apparatus 101 may be configured to enhance the resolution of the high frequency rotating voltage vector during the PWM. It would be appreciated that the resolution of the high frequency rotating voltage vector would influence the accuracy of PMSM control and detection. In practice, a switch device for performing PWM is generally implemented by an insulated gate bi-polar transistor (IGBT) and so forth, with the switch frequency ranging from 8 kHz to 12 kHz, for example. The modulation frequency provided by such PWM switch is too low for the high frequency rotating voltage vector (for example, a rotating frequency of 800 Hz or higher), rendering the resolution of the modulated voltage poor.

According to embodiments of the present invention, the resolution enhancing unit 301 may enhance the resolution of the high frequency rotating voltage vector during the PWM in various manners. For example, in some embodiments, the resolution enhancing unit 301 may comprise a first enhancing unit (not shown) configured to increase the switch frequency of the switch device (for example, IGBT device) for performing the PWM. This is easy to implement, but high frequency switching increases switching loss for IGBT device which decreases power efficiency and shortens device product life time. In order to address this problem, in some embodiments, the resolution enhancing unit 301 may alternatively or additionally comprise a second enhancing unit (not shown) configured to increase the effective modulation frequency for a carrier of the PWM. Specifically, according to embodiments of the present invention, the second enhancing unit may be configured to logically merge adjacent PWM carrier cycles by shifting PWM conductive time periods within adjacent carrier cycles together to therefore enhance the effective modulation frequency of the PWM, which will be detailed below with reference to FIG. 4.

Furthermore, in some embodiments of the present invention, a reference voltage vector may be provided to drive the PMSM to operate at a low speed while the high frequency rotating voltage vector is injected, as discussed above. Additionally, the reference voltage vector may be subjected to PWM such as SVPWM as well. In such embodiments, the high frequency rotating voltage vector and the reference voltage vector may be merged before being injected into the PMSM. To this end, the control apparatus 101 comprises a voltage merging unit 302 configured to merge the high frequency rotating voltage vector and the reference voltage vector, as shown in FIG. 3. According to embodiments of the present invention, merging the high frequency rotating voltage vector and the reference voltage vector may be done at the stage of $\alpha\beta$-axis voltage calculation. However it could be appreciated that such merging will result in high computation complexity and costs since the SVPWM calculation should be done every half PWM cycle and multiplication and division operations are required.

Alternatively, the voltage merging unit 302 may be configured to merge the high frequency rotating voltage vector and the reference voltage vector during the PWM calculation of these two voltage vectors. An exemplary embodiment in this regard will be detailed below with reference to FIG. 5, where the high frequency rotating voltage vector and the reference voltage vector are injected into a three-phase PMSM after going through a 5-sector SVPWM.

Figure 4:
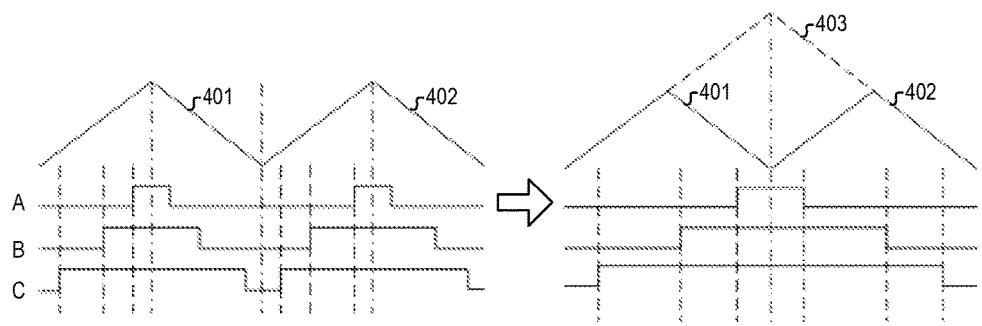
FIG. 4 shows schematic diagrams of enhancement of the PWM effective modulation frequency according to an exemplary embodiment of the present invention.

FIG. 4 shows an exemplary embodiment of the resolution enhancement by the resolution enhancing unit 301. As shown, in each of the carrier cycles 401 and 402 for PWM, the original PWM waveforms for respective phases (Phases A, B and C in this case) are center-aligned and symmetric. According to embodiments of the present invention, temporal displacement may be performed to shift PWM conductive time periods together within adjacent carrier cycles. In this way, the time periods of high levels in the carrier cycles 401 and 402 are converted to the end and start of the carrier cycles 401 and 402, respectively. As such, the adjacent carrier cycles 401 and 402 are logically merged into a new carrier cycle 403 with the frequency reduced by half as compared to the original carrier cycle 401 or 402. It is clear that the duty cycle of the PWM does not change after the merging in such an embodiment. In this way, the effective modulation frequency of the PWM carrier may be doubled without changing the switch frequency of the PWM switch device, and the resolution of the modulated high frequency rotating voltage vector may be enhanced accordingly. It should be noted that according to embodiments of the present invention, the first enhancing unit and the second enhancing unit may operates separately or cooperatively. The scope of the present invention is not limited in this regard.

Figure 5:
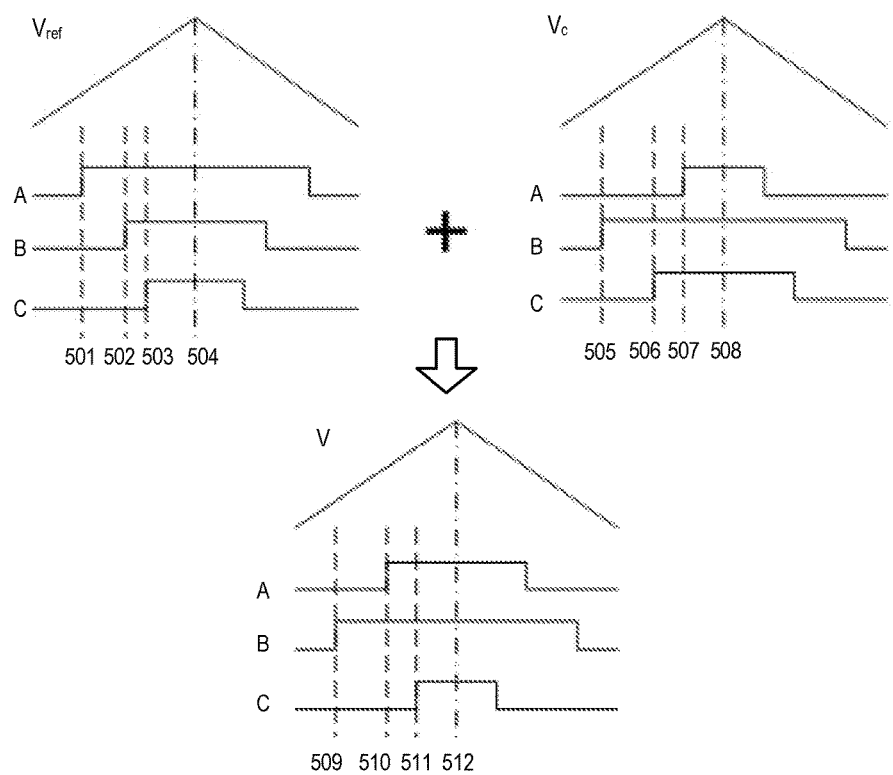
FIG. 5 shows schematic diagrams of voltage merging at the PWM stage according to an exemplary embodiment of the present invention.

FIG. 5 shows an exemplary embodiment of the voltage merging at the PWM stage by the voltage merging unit 302. As shown, with regard to the reference voltage vector $V_{ref}$, the time period between lines 501 and 502 is represented as $T_1/2$, the time period between lines 502 and 503 is represented as $T_2/2$, and the time period between lines 503 and 504 is represented as $T_0/4$. Accordingly, within half of a PWM cycle, the effective conductive time of phases A and B are $(T_1+T_2)/2$ and $T_2/2$, respectively, and phase C does not have an effective conductive time. Similarly, for the high frequency rotating voltage vector $V_c$, the time period between lines 505 and 506 is represented as $T_3/2$, the time period between lines 506 and 507 is represented as $T_4/2$, and the time period between lines 507 and 508 is represented as $T_0'/4$. Accordingly, the effective conductive time of phases B and C are $(T_3+T_4)/2$ and $T_4/2$, respectively, and phase A does not have an effective conductive time.

According to embodiments of the present invention, merging of the reference voltage vector and the high frequency rotating voltage vector may be implemented in the following manner at the PWM phase. First, for each phase of the two voltage vectors, the conductive times are added. In the example of FIG. 5, the sums of conductive times of phases A, B and C are respectively shown below:

$$(T_1+T_2)/2+T_0/4+T_0'/4=(T_1+T_2)/2+(T_0+T_0')/4 \quad \text{Phase A:}$$

$$T_2/2+T_0/4+(T_3+T_4)/2+T_0'/4=(T_2+T_3+T_4)/2+(T_0+T_0')/4 \quad \text{Phase B:}$$

$$T_0/4+T_4/2+T_0'/4=T_4/2+(T_0+T_0')/4 \quad \text{Phase C:}$$

At the second step, the shortest conductive time among the three phases is identified. In this example, the shortest conductive time is $T_4/2+(T_0+T_0')/4$ of Phase C. Then, at the third step, the shortest conductive time is subtracted from the conductive times of the three phases:

$$(T_1+T_2-T_4)/2 \quad \text{Phase A:}$$

$$(T_2+T_3)/2 \quad \text{Phase B:}$$

$$0 \quad \text{Phase C:}$$

In this way, new 3-phase conductive times of the 5-sector SVPWM are obtained.

It should be noted that the above descriptions are just exemplary without limiting the scope of the present invention. This approach may have different variations for different application scenarios. For example, for the 7-sector SVPWM, new conductive times may be calculated by subtracting the longest conductive time as described in the third step from the PWM cycle to calculate $T_0''/4$ and then adding $T_0''/4$ to the conductive times for respective phases (results of the third step). Accordingly, conductive times for each phase of the merged voltage V can be derived to determine the PWM waveform:

$$T_k/2=(T_3-T_1+T_4)/2$$

$$T_{k1}/2=(T_1+T_2-T_4)/2$$

$$T_0''/4=(T_{pwm}-T_2-T_3)/4$$

where $T_k/2$, $T_{k1}/2$ and $T_0''/4$ represents the time lengths between vertical lines 509 and 510, 510 and 511, and 511 and 512, respectively, and $T_{pwm}$ represents the time length of one PWM cycle or one carrier cycle.

It would be appreciated that by merging the high frequency rotating voltage vector and the reference voltage vector at the stage of PWM, it is only necessary to carry out addition and subtraction operations to calculate the vector sum of the two voltages. Therefore, the computation complexity and costs will be decreased significantly. Moreover, in some embodiments, the voltage merging unit 302 may be configured to further simplify the voltage merging by use of a lookup table. Specifically, in some embodiments, the voltage generating unit 201 may be configured to generate the high frequency rotating voltage vector with fixed amplitude and rotating frequency. In such embodiments, it is possible to determine the compare values of the high frequency rotating voltage vector to be injected into the PWM in advance. Accordingly, for each phase, the duty cycles of the high frequency rotating voltage vector at multiple angles may be pre-calculated and stored in the lookup table. When merging the voltage vectors during the PWM, it is only necessary to access lookup table to determine the duty cycle of the high frequency rotating voltage vector at a given angle, without calculation routine per PWM cycle. In this way, the computation costs can be further decreased and the operation efficiency can be improved.

Figure 6:
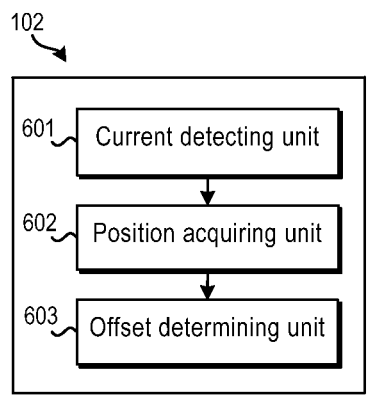
FIG. 6 shows a block diagram of a detection apparatus for use in calibration of a resolver associated with a PMSM according to an exemplary embodiment of the present invention.

The structures and functions of the control apparatus 101 have been described above. Now reference is made to FIG. 6, which shows a block diagram of a detection apparatus 102 as depicted in FIG. 1 according to an exemplary embodiment of the present invention. As shown in FIG. 6, according to embodiments of the present invention, the detection apparatus 102 comprises a current detecting unit 601 configured to detect a reference point associated with the phase current which is generated by the PMSM in response to a high frequency rotating voltage vector being injected into the PMSM operating at a low speed. Specifically, after the control apparatus 101 injects the high frequency rotating voltage vector into the PMSM, the PMSM will generate corresponding phase currents. For example, in the embodiments where the high frequency rotating voltage vector is generated according to equation (1) described above, the phase currents associated with the α and β axes of the PMSM may be expressed as:

$$\begin{bmatrix} I_{c\alpha} \\ I_{c\beta} \end{bmatrix} = \frac{1}{L_c^2 + \left(\frac{\Delta L_c}{2}\right)^2} \begin{bmatrix} L_c + \frac{\Delta L_c}{2}\cos(2\lambda_{dq'}) & \frac{\Delta L_c}{2}\sin(2\lambda_{dp'}) \\ \frac{\Delta L_c}{2}\sin(2\lambda_{dq'}) & L_c - \frac{\Delta L_c}{2}\cos(2\lambda_{dp'}) \end{bmatrix} \frac{V_c}{\omega_c}\begin{bmatrix} \sin(\omega_c t) \\ -\cos(\omega_c t) \end{bmatrix} \quad (2)$$

wherein $I_{c\alpha}$ and $I_{c\beta}$ represent the amplitudes of the phase currents associated with the α and β axes, respectively; $L_c$ represents an average value of the quadrature axis (q-axis) inductance and the direct axis (d-axis) inductance; $\Delta L_c$ represents the difference between the q-axis and the d-axis inductances; $\lambda_{dq'}$ represents the motor synchronous rotating angle (electric angle); $V_c$ represents the amplitude of the high frequency rotating voltage vector; $\omega_c$ represents the angular velocity of the high frequency rotating voltage vector; and t represents time.

According to embodiments of the present invention, the current detecting unit 601 can sample and detect only one of the phase currents to realize the calibration of the resolver. Additionally, in those embodiments where the current detecting unit 601 operates on the phase current of a digital form, the phase current from the PMSM may be converted into digital signals by means of an analog/digital converting process. Alternatively, in other embodiments, the current detecting unit 601 may directly operate on the analog signal of the phase current. In this event, the analog/digital conversion process can be omitted.

As described above, due to the saliency effect in the PMSM, the phase current is modulated by the rotor position of the PMSM. Therefore, by appropriately selecting a reference point associated with the phase current, it is possible to determine the corresponding rotor position at the time instant when the reference point occurs. For example, in some embodiments, the reference point associated with the phase current may be the zero-crossing point in the waveform of the phase current (or its certain component, e.g., low frequency component). In view of the saliency effect, it is known that the rotor position corresponding to the zero-crossing point of the filtered phase current of phase A is 90° or 270°, for example. Alternatively, the reference point may be the point at which the phase current reaches the maximum or minimum value. It is also possible to select any other suitable reference point, and the scope of the present invention is not limited in this regard. In practice, for example, the current detecting unit 601 may achieve the detection of the reference point in the phase current by means of a comparator.

Continuing reference to FIG. 6, the detection apparatus 102 may further comprise a position acquiring unit 602 configured to acquire the position of the resolver when the reference point is detected. As known, the resolver may provide its position to a special circuit or device in real time or periodically. In some embodiments, when the reference point is detected, the position acquiring unit 602 may use a signal or command to instruct the related circuit or device to latch the resolver position so as to be available for subsequent reading. Alternatively, the position acquiring unit 602 may directly read the position of the resolver from the circuit. As described above, the position of the resolver may be provided as an angle, which will be provided to an offset determining unit 602 in the detection apparatus 102 along with the rotor position corresponding to the reference point.

According to embodiments of the present invention, the offset determining unit 603 is configured to determine the offset between the resolver position acquired by the position acquiring unit 602 and the rotor position corresponding to the reference point. For example, in embodiments where the reference point is selected as the zero-crossing point of the waveform of the phase current, the rotor position corresponding to the reference point is 90°, for example. At this point, the difference between the angle value of the resolver position and 90° is the offset between the zero position of the resolver and the control zero-point of the PMSM. This offset may be then used to calibrate the resolver and accurately determine the rotor position of the PMSM.

Through the above discussion, it would be appreciated that based on the saliency effect in the PMSM, the detection apparatus 102 may determine the resolver offset efficiently and accurately by detecting the phase current. The accuracy of the resolver offset as determined in this way can meet the requirement of precise motor control. Moreover, according to some embodiments of the present invention, the dimension and cost of the device would not be increased. Additionally, the detection apparatus 102 has good compatibility and may be used with any currently known or future developed PMSMs with saliency effect.

Figure 7:
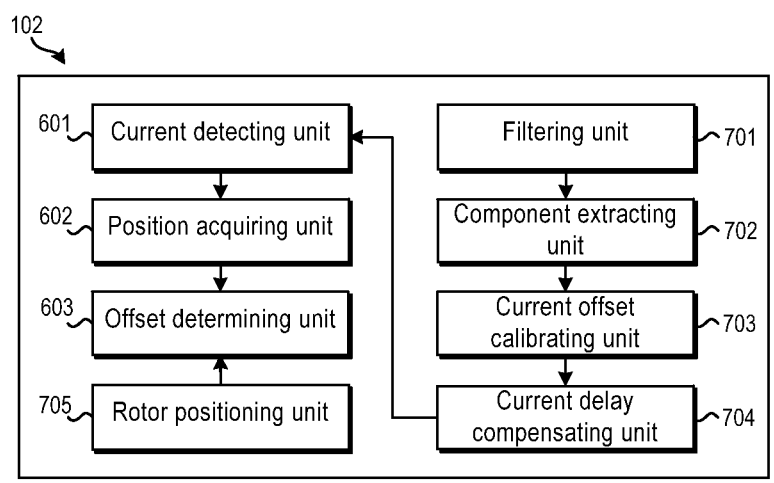
FIG. 7 shows a block diagram of a detection apparatus for use in calibration of a resolver associated with a PMSM according to another exemplary embodiment of the present invention.

FIG. 7 shows a block diagram of a detection apparatus 102 according to another exemplary embodiment of the present invention. Compared with the embodiment of FIG.

6, the detection apparatus 102 in the embodiment of FIG. 7 further comprises a filtering unit 701 configured to perform the high-pass filtering on the phase current to be detected. Alternatively or additionally, the filtering unit 701 may perform band-pass filtering or any other appropriate filtering on the phase current. The filtering unit 701 may be implemented by any high-pass, band-pass or any other appropriate filters no matter currently known or developed in the future. The scope of the present invention is not limited in this regard.

The filtered phase current is provided to a component extracting unit 702 so as to extract the low frequency component of the phase current. In the embodiment shown in FIG. 7, detection of the reference point may be performed with respect to the low frequency component of the phase current. By excluding the interference of irrelevant components, the accuracy and sensitivity of the detection of phase current can be further improved. As an example, the component extracting unit 702 may perform a finite impulse response (FIR) filtering on the input phase current to extract a low frequency component. Accordingly, in this embodiment, the current detecting unit 601 is configured to detect the reference point from the low frequency component of the phase current.

According to some embodiments, the detection apparatus 102 may further comprise at least one of a current offset calibrating unit 703 and a current delay compensating unit 704 in order to further improve the detection accuracy. According to embodiments of the present invention, the current offset calibrating unit 703 may perform offset calibration to the phase current. Various kinds of current offset calibration techniques, no matter currently known or developed in the future, can be used in connection with embodiments of the present invention, which will not be detailed here. The current delay compensating unit 704 may be configured to compensate one or more of the current sensor delay, analog/digital conversion delay, high-pass filtering delay, low frequency component extraction delay, and so forth. It should be noted that in some embodiments, if the total delay time is below a predetermined threshold, the compensation can be omitted. It would be appreciated that the offset calibration and/or delay compensation for the current is beneficial to improve the detection accuracy of the current detecting unit 601.

Alternatively or additionally, in some embodiments, the detection apparatus 102 may further comprise a rotor positioning unit 705 configured to perform the rotor positioning for the PMSM to estimate a rough range of the resolver offset. It would be appreciated that the waveform type of the phase current generated by the PMSM in response to the injected high frequency rotating voltage vector is, for example, a modulated sine or cosine waveform. Therefore, the correspondence between the rotor position and the reference point may not be a one-to-one correspondence. For example, when the zero-crossing point is selected as the reference point, the rotor position of the PMSM may be 90° or 270° when the reference point is detected. In order to uniquely determine the rotor position, according to embodiments of the present invention, the rotor positioning unit 705 may perform rotor positioning for the PMSM prior to the phase current detection. The rotor positioning may be implemented in various manners. For example, in some embodiments, voltage may be applied to one or more phases of the PMSM so as to force the rotor to align therewith. At this point, a rough range of the resolver offset may be estimated by reading the resolver position without adding any additional hardware device. Alternatively or additionally, the rotor positioning may be done by measuring the back electromotive force (EMF) waveform of the PMSM, measuring the torque generated by the PMSM or any other suitable manners. Any currently known or future developed rotor positioning approaches may be used with embodiments of the present invention, and the scope of the present invention is not limited in this regard. In this way, when the reference point is detected in the phase current, among multiple candidate offsets, the offset that falls within the estimated offset range can be uniquely determined as the resolver offset.

Figure 8:
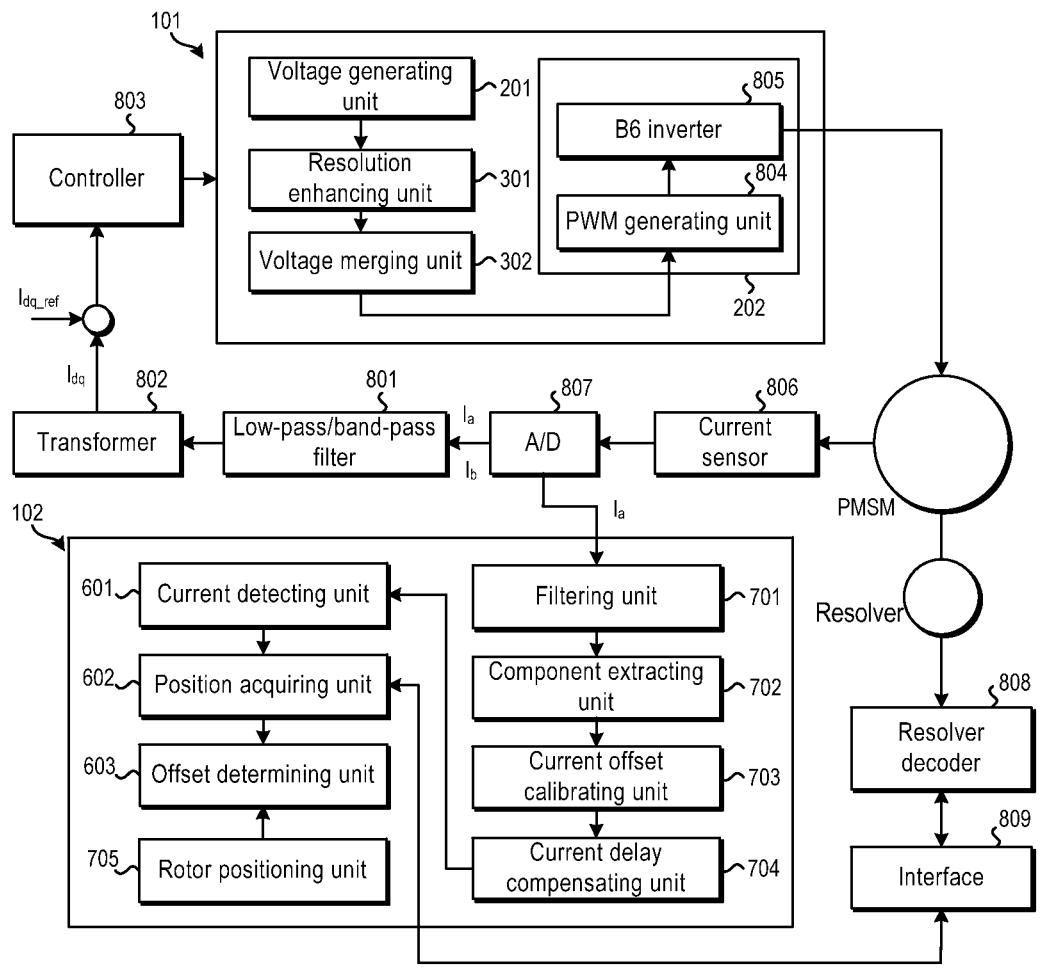
FIG. 8 shows a block diagram of a specific implementation of a calibrating system for a resolver associated with a PMSM according to an exemplary embodiment of the present invention.

FIG. 8 shows a block diagram of a specific implementation of the calibration system 100 according to an exemplary embodiment of the present invention. In the embodiment shown in FIG. 8, the reference voltage vector is provided to the three-phase PMSM to drive the PMSM while the high frequency rotating voltage vector is injected. As shown, the low-pass/band-pass filter 801 performs the low-pass or band-pass filtering on the two phase currents $I_a$ and $I_b$ generated by the PMSM, and the filtered signals are subjected to coordinate transform by the transformer 802 to obtain the direct-quadrature axis current $I_{dq}$. The direct-quadrature axis current $I_{dq}$ is adjusted with respect to the reference current $I_{dq\_ref}$ and then provided to a controller 803. The controller 803 controls the error of the input current and then performs inverse coordinate transform to generate the reference voltage vector. Specifically, according to embodiments of the present invention, the transformer 802 and the controller 803 may or may not refer to the PMSM rotor position or its estimate, thereby achieving closed-loop or open-loop motor control.

Then the reference voltage vector, along with the high frequency rotating voltage vector generated by the voltage generating unit 201, is provided to a resolution enhancing unit 301 for resolution enhancement. Output of the resolution enhancing unit 301 is provided to the voltage merging unit 302 in order to merge the reference voltage vector and the high frequency rotating voltage vector. Specifically, as described above, if the amplitude and rotating frequency of the high frequency rotating voltage vector are fixed, the duty cycles of the high frequency rotating voltage vector at various angles may be obtained by accessing the lookup table.

Next, the voltage injecting unit 202 injects the reference voltage vector and the high frequency rotating voltage vector into the PMSM. In the embodiment as shown in FIG. 8, the voltage injecting unit 202 comprises a PWM generating unit 804 and a six switch three phase inverter (B6 inverter) 805 for injecting the voltage vector into the three-phase PMSM. The PWM generating unit 804 and B6 inverter 805 may be implemented by any currently known or future developed devices, which will not be detailed here.

In response to the injection of the voltage vector, the phase currents $I_a$ and $I_b$ generated by the PMSM may be sensed by the current sensor 806 and then converted into digital signals by the analog/digital converter (A/D) 807. In the embodiment shown in FIG. 8, $I_a$ and $I_b$ may be filtered by the low-pass/band-pass filter 801. The filtered phase current is provided to the transformer 802 to thereby form a control loop for the PMSM. On the other hand, one of the phase currents ($I_a$ in this case) is provided to the filtering unit 701 in the detection apparatus 102, and then processed by the component extracting unit 702, the current offset calibrating unit 703, and the current delay compensating unit 704, as discussed above. The processed phase current is then provided to the current detecting unit 601 for reference point detection. When the reference point is detected, the position acquiring unit 602 uses a signal or command to instruct the resolver digital decoder 808 (which, for example, may be implemented as a digital decoding chip) to latch the position of the resolver.

The position acquiring unit 602 receives the resolver position from the resolver digital decoder 808, for example, via the interface 809 (such as a parallel port or a serial peripheral interface). Then position acquiring unit 602 provides the acquired resolver position to the offset determining unit 603 to determine the offset between the acquired resolver position and the rotor position corresponding to the reference point, which is quantitatively equal to the resolver offset (i.e., the angle difference between the zero position of the resolver and the control zero point of the PMSM). In order to accurately determine and calibrate the offset, as described above, the rotor positioning unit 705 in the detection apparatus 201 may perform rotor positioning for the PMSM in advance so as to determine a rough range of the resolver offset.

It should be noted that although the control apparatus 101 and the detection apparatus 102 as discussed above are described as two separate apparatuses, they may be implemented as a single apparatus in practice. For example, the calibration system 100 may be implemented in a single circuit chip or the like. Moreover, division of various units in the control apparatus 101 and the detection apparatus 102 is not limited to the examples discussed above. For example, in some embodiments, one or more units (for example, the voltage generating unit and/or the voltage injecting unit) in the control apparatus 101 may be implemented by the detection apparatus 102, and vice versa. Furthermore, according to embodiments of the present invention, various units as described above may be implemented by hardware, software, firmware or any combination thereof.

It would be appreciated that according to embodiments of the present invention, accurate calibration of the resolver can be achieved without any additional hardware circuit or dedicated device or sensor. For example, the control apparatus 101 and/or detection apparatus 102 according to embodiments of the present invention may be implemented on a micro controller unit (MCU) for the PMSM to realize a low-cost, small-sized, and precise resolver calibration. Moreover, even for those PMSM that have already been installed and used, embodiments of the present invention may also be easily implemented.

Figure 9:
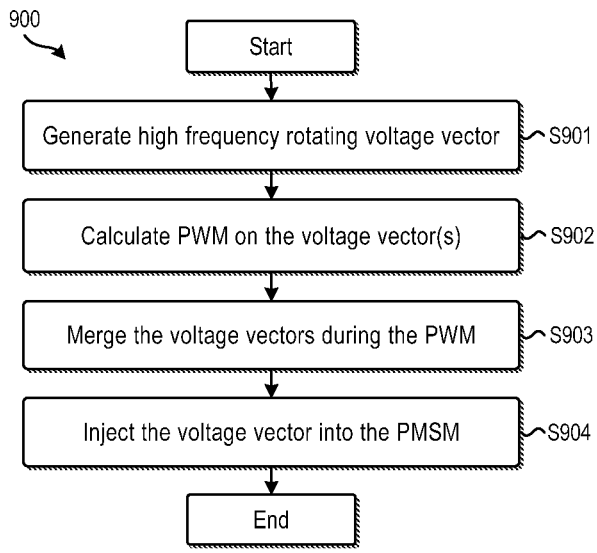
FIG. 9 shows a flow chart of a control method for use in calibration of a resolver associated with a PMSM according to an exemplary embodiment of the present invention.

Hereinafter, a method for use in calibration of a resolver of a PMSM according to the present invention is described with reference to FIGS. 9 and 10. FIG. 9 shows a flowchart of a method 900 carried out by the control apparatus 101 as described above. At step S901, a high frequency rotating voltage vector is generated. Specifically, generating the high frequency rotating voltage vector may comprise, for example, calculating the PWM, such as the SVPWM, for the high frequency rotating voltage vector. In such an embodiment, the method 900 proceeds to an optional step S902 where the resolution of the high frequency rotating voltage vector is enhanced during the PWM. For example, enhancement of the voltage resolution may be done by at least one of: increasing the switch frequency of the PWM switch device, and increasing the effective modulation frequency of the PWM carrier. Specifically, the effective modulation frequency may be increased by merging adjacent symmetrical PWM cycles by temporal displacement, for example.

Next, at optional step S903, the high frequency rotating voltage vector and the reference voltage vector are merged during the PWM calculation. Specifically, if the high frequency rotating voltage vector has a predefined, fixed amplitude and rotating frequency, the duty cycle of the high frequency rotating voltage vector may be determined by accessing the lookup table during the merging, where the lookup table stores pre-calculated duty cycles of the high frequency rotating voltage vector at various angles. The method 900 then proceeds to step S904 where the high frequency rotating voltage vector is injected into a permanent magnet synchronous motor operating at a low speed to cause the permanent magnet synchronous motor to generate a phase current. As described above, the generated phase current will be used for the calibration of the resolver.

Figure 10:
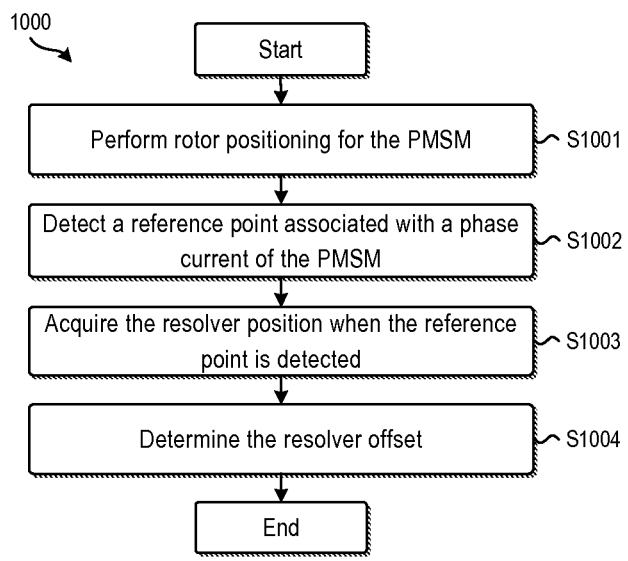
FIG. 10 shows a flow chart of a control method for use in calibration of a resolver associated with a PMSM according to an exemplary embodiment of the present invention.

FIG. 10 illustrates a flowchart of a method 100 implemented by the detection apparatus 102 as described above. At optional step S1001, the rotor positioning for the permanent magnet synchronous motor is performed prior to injecting the high frequency rotating voltage vector, in order to roughly estimate a range of the resolver offset. Next, at step S1002, in response to the high frequency rotating voltage vector being injected into the permanent magnet synchronous motor operating at a low speed, a reference point associated with a phase current generated by the permanent magnet synchronous motor is detected. In some embodiments, detection of the phase current may be directly performed. Alternatively, detection of the phase current may comprise performing high-pass filtering on the phase current, extracting a low frequency component of a high-pass filtered phase current, and detecting the reference point based on the low frequency component of the phase current. In some optional embodiments, the phase current may be subjected to offset calibration and/or delay compensation. The method 1000 then proceeds to step S1003 to acquire the resolver position when the reference point is detected. As discussed above, according to embodiments of the present invention, the reference point may be the zero-crossing point in the waveform of the phase current. Then at step S1004, an offset between the acquired resolver position and the rotor position of the permanent magnet synchronous motor corresponding to the reference point is determined for calibration of the resolver.

It should be noted that according to embodiments of the present invention, the method 900 and method 1000 may be performed one or more times periodically or responsive to user indications. In this way, in addition to the calibration of the resolver before the PMSM works, it is possible to detect whether the resolver operates normally during the operation of the PMSM.

The present invention may be described above with reference to several preferred embodiments. As mentioned above, the apparatus and/or function represented by each block in the block diagrams and flow charts may be implemented by virtue of hardware, for example an integrated circuit (IC), an application-specific integrated circuit (ASIC), a general integrated circuit, and a field programmable gate array (FPGA), and so forth. Alternatively or additionally, some or all of the functions may be implemented through computer program code. For example, embodiments of the present invention comprise a computer program product which is tangibly stored on a non-transient computer-readable medium and comprises a machine-readable instruction which, when being executed, enables the machine to perform the steps of above described method 900 and/or method 1000. In this aspect, the computer program code may be complied through one or more program design languages or a combination thereof. Moreover, the functions represented in the blocks may also occur in a sequence different from what is shown in the figures. For example, two blocks shown in succession may, in fact, be executed substantially concurrently, or the blocks may sometimes be executed in a reverse order, depending upon the functionality involved.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for calibrating a resolver associated with a permanent magnet synchronous motor, the method comprising:
    generating a high frequency rotating voltage vector;
    enhancing a resolution of the high frequency rotating voltage vector while it is subjected to pulse width modulation, wherein the enhancing includes increasing a switch frequency of a switch device for the pulse width modulation or increasing an effective modulation frequency of a carrier for the pulse width modulation, the increasing the effective modulation frequency including shifting pulse width modulation conductive time periods within adjacent carrier cycles together; and
    injecting the high frequency rotating voltage vector into the permanent magnet synchronous motor operating at a low speed to cause the permanent magnet synchronous motor to generate a phase current, wherein the phase current is for calibrating the resolver.

2. The method according to claim 1, wherein the permanent magnet synchronous motor is driven by a reference voltage vector, the method further comprising:
    merging the high frequency rotating voltage vector and the reference voltage vector during pulse width modulation for the high frequency rotating voltage vector and the reference voltage vector.

3. The method according to claim 2, wherein the high frequency rotating voltage vector has fixed amplitude and rotating frequency, wherein merging the high frequency rotating voltage vector and the reference voltage vector comprises:
    accessing a lookup table during the merging to determine a duty cycle of the high frequency rotating voltage vector, the lookup table storing pre-calculated duty cycles of the high frequency rotating voltage vector at a plurality of angles.

4. A non-transient computer-readable medium having a computer program tangibly stored thereon for calibration of a resolver associated with a permanent magnet synchronous motor, the computer program comprising machine executable instructions which, when executed, cause the machine to perform the method according to claim 1.

5. A method for calibrating a resolver associated with a permanent magnet synchronous motor, the method comprising:
    responsive to a high frequency rotating voltage vector being injected into the permanent magnet synchronous motor operating at a low speed, detecting a reference point associated with a phase current generated by the permanent magnet synchronous motor, wherein a resolution of the high frequency rotating voltage vector is enhanced while it is subjected to pulse width modulation, wherein the enhancing includes increasing a switch frequency of a switch device for the pulse width modulation or increasing an effective modulation frequency of a carrier for the pulse width modulation, the increasing the effective modulation frequency including shifting pulse width modulation conductive time periods within adjacent carrier cycles together;
    acquiring a position of the resolver when the reference point is detected; and
    determining an offset between the acquired position of the resolver and a rotor position of the permanent magnet synchronous motor corresponding to the reference point for calibrating the resolver.

6. The method according to claim 5, wherein detecting the reference point associated with the phase current generated by the permanent magnet synchronous motor comprises:
    performing high-pass filtering on the phase current;
    extracting a low frequency component of the high-pass filtered phase current; and
    detecting the reference point based on the low frequency component of the phase current.

7. The method according to claim 5, further comprising at least one of:
    performing offset calibration on the phase current; and
    performing delay compensation on the phase current.

8. The method according to claim 5, further comprising:
    prior to injecting the high frequency rotating voltage vector, estimating a range of the offset by performing rotor positioning for the permanent magnet synchronous motor.

9. The method according to claim 5, further comprising:
    generating the high frequency rotating voltage vector; and
    injecting the high frequency rotating voltage vector into the permanent magnet synchronous motor operating at a low speed to cause the permanent magnet synchronous motor to generate the phase current.

10. The method according to claim 5, wherein the reference point is a zero-crossing point in a waveform of the phase current.

11. A non-transient computer-readable medium having a computer program tangibly stored thereon for calibrating a resolver associated with a permanent magnet synchronous motor, the computer program comprising machine executable instructions which, when executed, cause the machine to perform the method according to claim 5.

12. An apparatus for calibrating a resolver associated with a permanent magnet synchronous motor, the apparatus comprising:
    a voltage generator configured to generate a high frequency rotating voltage vector;
    a resolution enhancer configured to enhance a resolution of the high frequency rotating voltage vector while it is subjected to pulse width modulation, wherein the resolution enhancing includes increasing a switch frequency of a switch device for the pulse width modulation or increasing an effective modulation frequency of a carrier for the pulse width modulation, the increasing the effective modulation frequency including shifting pulse width modulation conductive time periods within adjacent carrier cycles together; and
    a voltage injector configured to inject the high frequency rotating voltage vector into the permanent magnet synchronous motor operating at a low speed to cause the permanent magnet synchronous motor to generate a phase current, wherein the phase current is for calibrating the resolver.

13. The apparatus according to claim 12, wherein the permanent magnet synchronous motor is driven by a reference voltage vector, the apparatus further comprising:
a voltage merger configured to merge the high frequency rotating voltage vector and the reference voltage vector during pulse width modulation for the high frequency rotating voltage vector and the reference voltage vector.

14. The apparatus according to claim 13, wherein the high frequency rotating voltage vector has fixed amplitude and rotating frequency, and wherein the voltage merger is configured to access a lookup table during the merging to determine a duty cycle of the high frequency rotating voltage vector, the lookup table storing pre-calculated duty cycles of the high frequency rotating voltage vector at a plurality of angles.

15. An apparatus for calibrating a resolver associated with a permanent magnet synchronous motor, comprising:
a current detector configured to detect, responsive to a high frequency rotating voltage vector being injected into the permanent magnet synchronous motor operating at a low speed, a reference point associated with a phase current generated by the permanent magnet synchronous motor;
a resolution enhancer configured to enhance a resolution of the high frequency rotating voltage vector while it is subjected to pulse width modulation, wherein the resolution enhancing includes increasing a switch frequency of a switch device for the pulse width modulation or increasing an effective modulation frequency of a carrier for the pulse width modulation, the increasing the effective modulation frequency including shifting pulse width modulation conductive time periods within adjacent carrier cycles together;
a position acquirer configured to acquire a position of the resolver when the reference point is detected; and
an offset determiner configured to determine an offset between the acquired position of the resolver and a rotor position of the permanent magnet synchronous motor corresponding to the reference point for calibrating the resolver.

16. The apparatus according to claim 15, further comprising:
a filter configured to perform high-pass filtering on the phase current; and
a component extracter configured to extract a low frequency component of the high-pass filtered phase current,
wherein the current detector is configured to detect the reference point based on the low frequency component of the phase current.

17. The apparatus according to claim 15, further comprising at least one of:
a current offset calibrator configured to perform offset calibration on the phase current; and
a current delay compensator configured to perform delay compensation on the phase current.

18. The apparatus according to claim 15, further comprising:
a rotor positioner configured to estimate, prior to injecting the high frequency rotating voltage vector, a range of the offset by performing rotor positioning for the permanent magnet synchronous motor.

19. The apparatus according to claim 15, wherein the reference point is a zero-crossing point in a waveform of the phase current.

20. A system for calibrating a resolver associated with a permanent magnet synchronous motor, the system comprising:
a voltage generator configured to generate a high frequency rotating voltage vector;
a resolution enhancer configured to enhance a resolution of the high frequency rotating voltage vector while it is subjected to pulse width modulation, wherein the resolution enhancing includes increasing a switch frequency of a switch device for the pulse width modulation or increasing an effective modulation frequency of a carrier for the pulse width modulation, the increasing the effective modulation frequency including shifting pulse width modulation conductive time periods within adjacent carrier cycles together;
a voltage injector configured to inject the high frequency rotating voltage vector into the permanent magnet synchronous motor operating at a low speed to cause the permanent magnet synchronous motor to generate a phase current, wherein the phase current is for calibrating the resolver;
a current detector configured to detect, responsive to the high frequency rotating voltage vector being injected into the permanent magnet synchronous motor operating at a low speed, a reference point associated with the phase current generated by the permanent magnet synchronous motor;
a position acquirer configured to acquire a position of the resolver when the reference point is detected; and
an offset determiner configured to determine an offset between the acquired position of the resolver and a rotor position of the permanent magnet synchronous motor corresponding to the reference point for calibrating the resolver.

* * * * *